Figure 1:
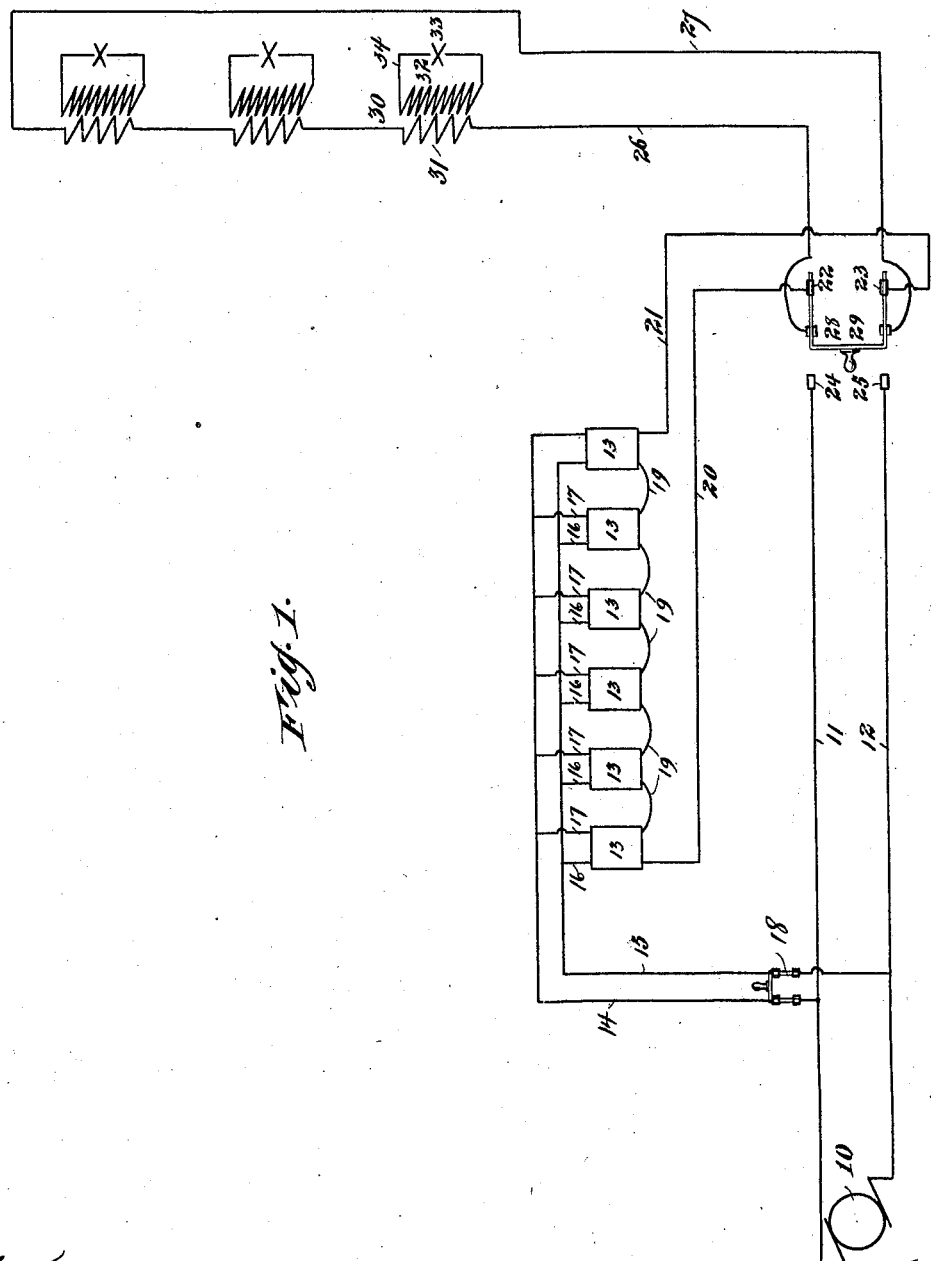

No. 694,190. Patented Feb. 25, 1902.
L. & A. PRIVAT.
ARC LIGHTING SYSTEM FOR ALTERNATING CURRENTS.
(Application filed June 10, 1899.)
(No Model.) 2 Sheets—Sheet 1.

No. 694,190. Patented Feb. 25, 1902.
L. & A. PRIVAT.
ARC LIGHTING SYSTEM FOR ALTERNATING CURRENTS.
(Application filed June 10, 1899.)
(No Model.) 2 Sheets—Sheet 2.
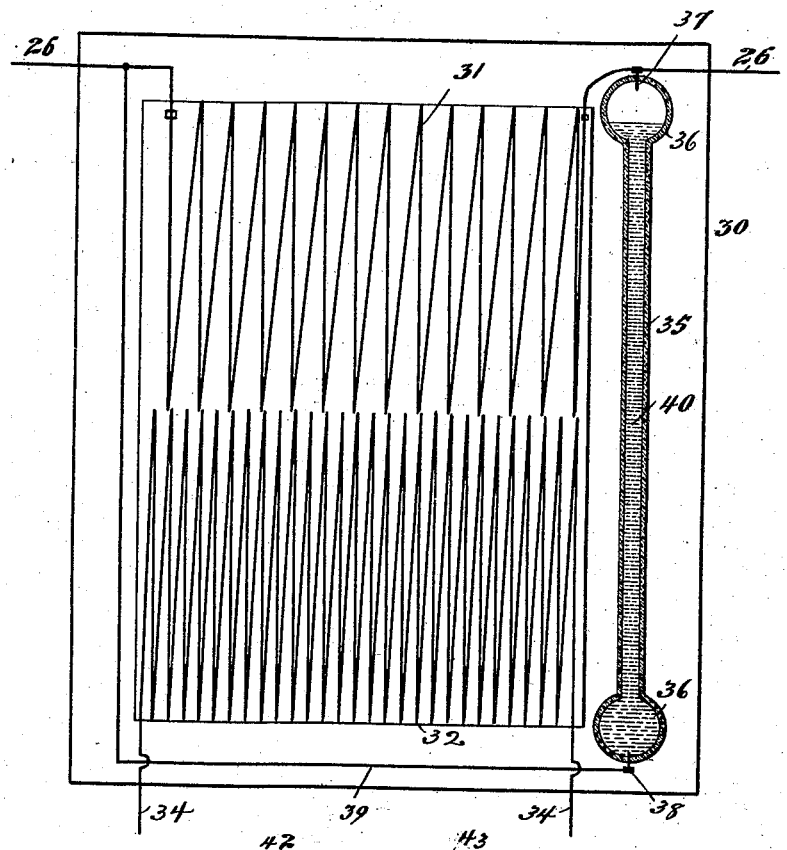

UNITED STATES PATENT OFFICE.

LOUIS PRIVAT AND ABRAHAM PRIVAT, OF OAKPARK, ILLINOIS.

ARC-LIGHTING SYSTEM FOR ALTERNATING CURRENTS.

SPECIFICATION forming part of Letters Patent No. 694,190, dated February 25, 1902.

Application filed June 10, 1899. Serial No. 720,058. (No model.)

*To all whom it may concern:*

Be it known that we, LOUIS PRIVAT and ABRAHAM PRIVAT, of Oakpark, in the county of Cook and State of Illinois, have invented certain new and useful Improvements in Arc-Lighting Systems for Alternating Currents, of which the following is a specification.

This invention relates to arc-lighting systems for alternating currents, and has for its object to provide a system employing the ordinary series circuit in which arc-lamps of dissimilar character and candle-power may be used without affecting each other and without interfering with the use of the dynamo for incandescent lighting.

To this and other ends our invention consists in certain novel features which we will now proceed to describe and will then particularly point out in the claims.

In the accompanying drawings, Figure 1 is a diagram of a system embodying our invention. Fig. 2 is a view of an automatic cut-out adapted for use in our improved system, and Figs. 3 and 4 are respectively face and edge views of a mechanical cut-out which may be employed in place of the automatic cut-out shown in Fig. 2.

Referring to the said drawings, 10 indicates an alternating dynamo or generator of any approved type, and 11 12 the mains conected therewith. In connection with the dynamo and mains we employ a bank of converters 13, of which the primary coils are connected in parallel to the dynamo-mains by means of wires 14, 15, 16, and 17 or in any other suitable manner, a switch or cut-out 18 being interposed, if desired. The secondary coils of the bank of converters are connected in series with each other by wires 19, while from the end converters the secondary coils are connected by wires 20 and 21 to suitable terminals 22 and 23, each lying opposite the terminals 24 and 25 of the mains 11 and 12.

26 and 27 indicates the wires of the series circuit, which are connected to terminals 28 and 29, which may be connected by a suitable switch with either the terminals 24 and 25 of the mains or the terminals 22 and 23 of the secondary circuit of the bank of converters.

At each place in the circuit 26 27 where an arc-lamp is to be placed a converter is employed, which is indicated as a whole by the reference-numeral 30. Its primary coil 31 forms a part of the series circuit, while its secondary coil 32, which is not in metallic connection with the primary coil, supplies induced current to the lamp 33 through a circuit 34. While any suitable style of transformer may be used for the lamp-circuits—as, for instance, converters of the type known as "hedgehog," which does not possess a complete magnetic circuit through metal—we prefer to employ what is known as a "closed magnetic converter" having a continuous magnetic circuit through metal. In order to insure continuity of service with converters of this type, we employ in connection therewith an automatic cut-out which in its preferred form is constructed in the manner shown in detail in Fig. 2 of the drawings. In this construction 35 indicates a tube which is placed in a vertical position and is either constructed of glass or some other similar insulating material or of metal or any other non-insulating material lined internally with some insulating substance, such as enamel. The body of this tube is cylindrical, while its ends are provided with spherical enlargements 36, in which are mounted electrodes 37 and 38, which extend from the exterior to the interior of said enlargements. The electrode 37 is connected to the wire 26 on one side of the primary coil 31, while the electrode 38 is connected by means of a wire 39 with the wire 26 on the other side of the primary coil 31. The tube 35 is filled with mercury, as indicated at 40. The amount of mercury to be employed in each cut-out is separately determined, and depends upon the size of the converter, the temperature at which it works, and the difference of potential at its primary terminals. When these data have been ascertained, the amount of mercury is so adjusted that when the converter is working at its normal temperature the mercury will rise in the tube and in the upper spherical enlargement to a distance from the upper electrode 37 whose dielectric shall be less than that of the primary coil to a disruptive charge of electricity. Preferably the cut-out is so constructed that the space at its upper end is exhausted of air, so as to form a partial or complete vacuum. This may be accomplished in the manner usually employed in the construction of thermometers by heating the mercury until it fills the entire cavity of the cut-out and then sealing the tube.

Instead of the cut-out just described a purely mechanical cut-out, such as is shown in Figs. 3 and 4 of the drawings, may be employed. This cut-out consists of two overlapping metallic plates 41 and 42, having interposed between them a sheet of tissue-paper 43 or other suitable insulating material. It will be understood, of course, that the plates 41 and 42 are suitably connected to the wire 26 on opposite sides of the coil 31, although this form of cut-out may also be applied to the secondary coil 32, if desired.

It will be seen that any number of lamps and converters may be used on the circuit at the same time if the proper voltage is provided for them. It will also be seen that lamps of dissimilar candle-power and character may be used in the same circuit without interference with each other, this being rendered possible by the use of converters of the proper size and character to suit each particular lamp, so that differential, constant-current, and constant-potential lamps may all be employed in the same circuit. When the supply of current for the series circuit is obtained from the bank of converters described, it is obvious that by this arrangement any desired voltage may be obtained for the series circuit, either equal to or greater or less than the voltage of the dynamo. This arrangement, moreover, does not interfere with the use of the same dynamo for incandescent lighting. If for any reason the secondary circuit of any one of the series converters becomes broken, the inductive resistance of the primary coil thereof is greatly increased, and the flow of current is thereby retarded to such an extent that the lights may be extinguished. While this condition obtains, the temperature of the converter rises rapidly, but not to a degree sufficient to impair or cause the destruction of the series coil. This rise in temperature will expand the mercury in the cut-out, so as to cause it to make a contact with the upper electrode 37, and thereby shunt the current around the primary coil of the converter. When the regular current thus passes through the column of mercury, it maintains the temperature thereof, and thereby also maintains a permanent connection with the upper electrode during the passage of said current. The primary coil of the converter, of which the secondary circuit is interrupted, is thus completely cut out and the remaining lamps are left unaffected. If the mechanical cut-out shown in Figs. 3 and 4 is used, the current will establish a circuit through the insulating medium, separating the two plates or electrodes in an obvious manner.

The arrangement of series converters described affords the circuit a greater share of protection against disturbance from lightning than in the case of direct-current arc-lamp circuit. This protection is further increased by the use of the automatic cut-out, which, by reason of its less resistance to a disruptive charge than the primary coil, will shunt the current around said primary coil, it being understood, of course, that suitable lightning-arresters to carry the discharges to the ground will be located at convenient points on the series circuit. When a bank of converters is used to supply the current for the series circuit, still further protection against lightning is obviously afforded to the armature of the alternating dynamo.

We do not wish to be understood as limiting ourselves to the precise details set forth, as it is obvious that they may be varied without departing from the principle of our invention.

We claim—

1. An arc-lighting system for alternating currents, comprising an alternating generator, a circuit connected therewith, a plurality of converters having their primary coils arranged in series in said circuit, a plurality of arc-lamps, each connected in a separate circuit with the secondary coil of one of said converters, and an automatic cut-out for each converter connected in a shunt around the primary coil of the converter and comprising an insulated tube with a filling of mercury between its terminals adapted to expand when the primary coil is abnormally heated and thereby complete the shunt-circuit, substantially as described.

2. An arc-lighting system for alternating currents, comprising an alternating generator, a bank of converters having their primary coils connected in parallel to said generator and their secondary coils connected in series with each other, a separate induced current series circuit connected with said secondary coils, a plurality of converters arranged in series in said circuit, a plurality of arc-lamps, each connected in a separate circuit with the secondary coil of one of said last-mentioned converters, and a shunt-circuit extending around the primary of each of said last-mentioned converters and a normally open automatic switch adapted to be operated by abnormal resistance in the primary it controls, substantially as described.

3. An arc-lighting system for alternating currents, comprising an alternating generator, a bank of converters whose primary coils are connected in parallel to said generator and whose secondary coils are connected in series with each other, a separate induced current series circuit connected with said secondary coils, a plurality of converters having their primary coils arranged in series in said circuit, a plurality of arc-lamps, each connected in a separate circuit with the secondary coil of one of said last-mentioned converters, and an automatic cut-out for each of said last-mentioned converters adapted to be brought into operation by an abnormally-increased resistance in the primary and operating to shunt the circuit around the latter, substantially as described.

LOUIS PRIVAT.
ABRAHAM PRIVAT.

Witnesses:
HENRY S. TOWLE,
S. F. MCCREA.